US012621455B2

(12) United States Patent
Zare et al.

(10) Patent No.: US 12,621,455 B2
(45) Date of Patent: May 5, 2026

(54) APPARATUS, A METHOD AND A COMPUTER PROGRAM FOR VIDEO CODING AND DECODING

(71) Applicant: Nokia Technologies Oy, Espoo (FI)

(72) Inventors: Alireza Zare, Tampere (FI); Alireza Aminlou, Tampere (FI); Jani Lainema, Tampere (FI); Ramin Ghaznavi Youvalari, Tampere (FI); Pekka Astola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/702,015

(22) PCT Filed: Oct. 6, 2022

(86) PCT No.: PCT/FI2022/050666
§ 371 (c)(1),
(2) Date: Apr. 17, 2024

(87) PCT Pub. No.: WO2023/067242
PCT Pub. Date: Apr. 27, 2023

(65) Prior Publication Data
US 2025/0234000 A1     Jul. 17, 2025

(30) Foreign Application Priority Data

Oct. 21, 2021     (FI) ..................................... 20216089

(51) Int. Cl.
*H04N 19/105*          (2014.01)
*H04N 19/132*          (2014.01)
*H04N 19/593*          (2014.01)

(52) U.S. Cl.
CPC ......... *H04N 19/132* (2014.11); *H04N 19/105* (2014.11); *H04N 19/593* (2014.11)

(58) Field of Classification Search
CPC ... H04N 19/132; H04N 19/593; H04N 19/105
(Continued)

(56) References Cited

U.S. PATENT DOCUMENTS

2011/0280307 A1* 11/2011 MacInnis ........... H04N 5/44504
                                                        375/240.15
2013/0101035 A1     4/2013  Wang et al.
(Continued)

FOREIGN PATENT DOCUMENTS

WO          2020/007554 A1      1/2020
WO          2020/012023 A1      1/2020
WO          2020/180162 A1      9/2020

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

(Continued)

*Primary Examiner* — Jeffery A Williams
(74) *Attorney, Agent, or Firm* — McCarter & English LLP

(57)          ABSTRACT

A method comprising: obtaining image blocks (702) comprising image samples (704, 706); performing one or more pre-processing operations for at least part of the image samples (704, 706) based on directional correlation in said samples (704, 706); and encoding the pre-processed image samples (704, 706) with video or image coding means.

20 Claims, 11 Drawing Sheets

(58) Field of Classification Search
   USPC ..................................................... 375/240.12
   See application file for complete search history.

(56) References Cited

U.S. PATENT DOCUMENTS

| | | | |
|---|---|---|---|
| 2021/0136373 A1 | 5/2021 | De Luxan Hernandez et al. | |
| 2021/0195240 A1 | 6/2021 | Racape et al. | |
| 2021/0281882 A1 | 9/2021 | Pettersson et al. | |
| 2022/0321885 A1* | 10/2022 | Lim ....................... | H04N 19/18 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Versatile Video Coding", Series H: Audiovisual and Multimedia Systems Infrastructure of audiovisual services—Coding of moving video, Recommendation ITU-T H.266, Sep. 2023, 538 pages.
Office Action received for corresponding Finnish U.S. Appl. No. 20/216,089, dated Jun. 22, 2022, 10 pages.
Pfaff et al., "Intra Prediction and Mode Coding in VVC", IEEE Transactions on Circuits and Systems for Video Technology, vol. 31, No. 10, Oct. 2021, pp. 3834-3847.
Akramullah et al., "Performance of software-based MPEG-2 video encoder on parallel and distributed systems", IEEE Transactions on Circuits and Systems for Video Technology, vol. 7, No. 4, Aug. 1997, pp. 687-695.
International Search Report and Written Opinion received for corresponding Patent Cooperation Treaty Application No. PCT/FI2022/050666, dated Mar. 31, 2023, 17 pages.
Extended European Search Report for Application No. 22883034.5 dated Aug. 12, 2025, 10 pages.
Pfaff et al.: Intra Prediction and Mode Coding in VVC; IEEE Transactions on Circuits and Systems for Video Technology, vol. 31, No. 10, Oct. 2021.

* cited by examiner

0: Planar
1: DC

Obtain image blocks comprising image samples (600)

Perform one or more pre-processing operations for at least part of the image samples based on directional correlation in said samples (602)

Encode the pre-processed image samples with video or image coding means (604)

| DC | ... | ... | AC |
|----|-----|-----|----|
| DC | ... | ... | AC |
| DC | ... | ... | AC |
| DC | ... | ... | AC |

| DC | DC | ... | ... |
|----|----|-----|-----|
| DC | DC | ... | ... |
| ... | ... | AC | AC |
| ... | ... | AC | AC |

APPARATUS, A METHOD AND A COMPUTER PROGRAM FOR VIDEO CODING AND DECODING

RELATED APPLICATION

This application was originally filed as PCT Application No. PCT/FI2022/050666, filed on Oct. 6, 2022, which claims priority from FI application No. 20216089, filed on Oct. 21, 2021, of which priority is claimed and is incorporated herein by reference in its entirety.

TECHNICAL FIELD

The present invention relates to an apparatus, a method and a computer program for video coding and decoding.

BACKGROUND

Massively Parallel Processing (MPP) may be defined as a storage structure or a processing structure designed to handle the coordinated processing of program operations by multiple processors. When the processing is aimed for coding of media content, a term Massively Parallel Coding (MPC) may be used.

Parallel processing is a useful property for a video codec, which may enable the real-time operation and improve utilization of computational resources. The massively parallel coding (MPC) may be considered a necessity for real-time coding of emerging high-resolution content and large scale video streaming. Contemporary video codecs mainly support high-level parallelization using picture partitioning tools, such as partitioning into tiles, slices, subpictures, etc. This kind of high-level parallelization has a limited scalability, whereas a block/coding tree unit (CTU)-level massively parallel coding (MPC) of video content would provide much enhanced scalability.

However, in a massively parallel video coding paradigm where CTUs are coded in parallel, reference samples from the adjacent reconstructed blocks are not available for reconstructing reference samples array in intra prediction, as the CTUs are coded independently. Thus, MPC may incur coding efficiency losses since the coding dependencies among the CTUs are prohibited.

SUMMARY

Now in order to at least alleviate the above problems, enhanced methods are introduced herein. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

A method according to a first aspect comprises obtaining image blocks comprising image samples; performing one or more pre-processing operations for at least part of the image samples based on directional correlation in said samples; and encoding the pre-processed image samples with video or image coding means.

An apparatus according to a second embodiment comprises: means for obtaining image blocks comprising image samples; means for performing one or more pre-processing operations for at least part of the image samples based on directional correlation in said samples; and means for encoding the pre-processed image samples with video or image coding means.

According to an embodiment, at least one of said pre-processing operations is configured to reduce the number of samples along a direction having a strong correlation of image content.

According to an embodiment, at least one of said pre-processing operations comprises downsampling the content in reference lines direction.

According to an embodiment, at least one of said pre-processing operations comprises a packing operation.

According to an embodiment, the apparatus comprises means for packing horizontal and vertical reference lines content into a single picture using one or more partitioning operations.

According to an embodiment, the apparatus comprises means for packing the horizontal or the vertical reference lines in units of a stride size of N samples in a first direction; and means for placing each of the N sample units in the first direction or a second direction.

According to an embodiment, the apparatus comprises means for performing a loop of sampling the horizontal or the vertical reference lines with a stride size of every N samples, wherein the loop is repeated for each of offset values 1 to N defining the first sample to be sampled.

According to an embodiment, the apparatus comprises means for applying a one-dimensional (1-D) spatial-to frequency domain transform on the image samples in the reference line direction.

According to an embodiment, the apparatus comprises means for signaling the reference line direction by a picture-level indication.

According to an embodiment, at least one of said pre-processing operations comprises switching off one or more coding tools.

According to an embodiment, the apparatus comprises means for limiting the intra sub-partitioning (ISP) to the reference line direction.

According to an embodiment, the apparatus comprises means for ignoring a maximum number of allowed sub-partitions, when the intra sub-partitioning (ISP) is carried out in the reference line direction.

According to an embodiment, the apparatus comprises means for carrying out intra prediction as one-dimensional (1-D) planar prediction.

According to an embodiment, a filling order of the most probable mode (MPM) list is based on intra mode distribution in coding of reference lines content.

According to an embodiment, the apparatus comprises means for altering the cross-component linear model (CCLM) mode according to the reference line direction.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which:

FIGS. 9a and 9b show examples of 2-D spatial packings of horizontal reference lines according to an embodiment of the invention;

DETAILED DESCRIPTION OF SOME EXAMPLE EMBODIMENTS

Figure 1:
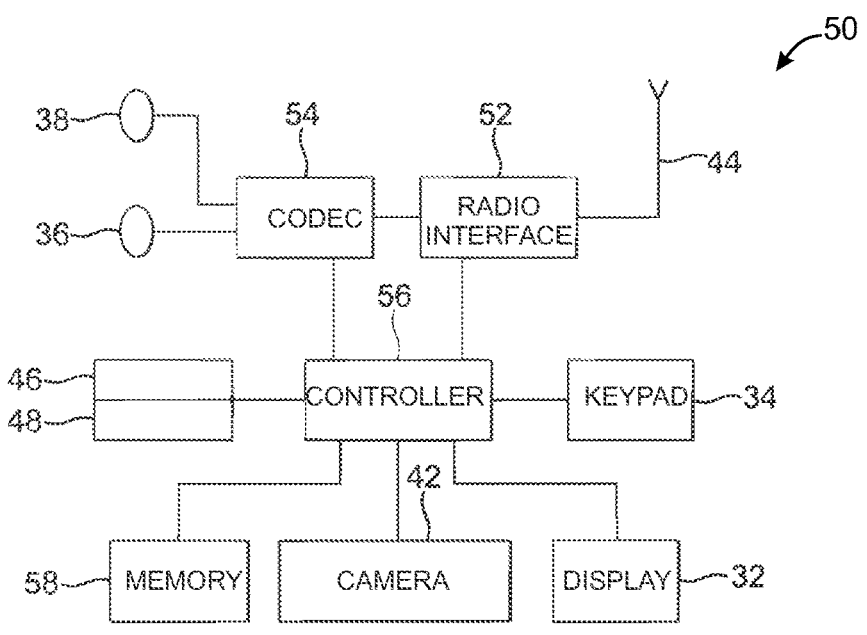
FIG. 1 shows schematically an electronic device employing embodiments of the invention.
Figure 2:
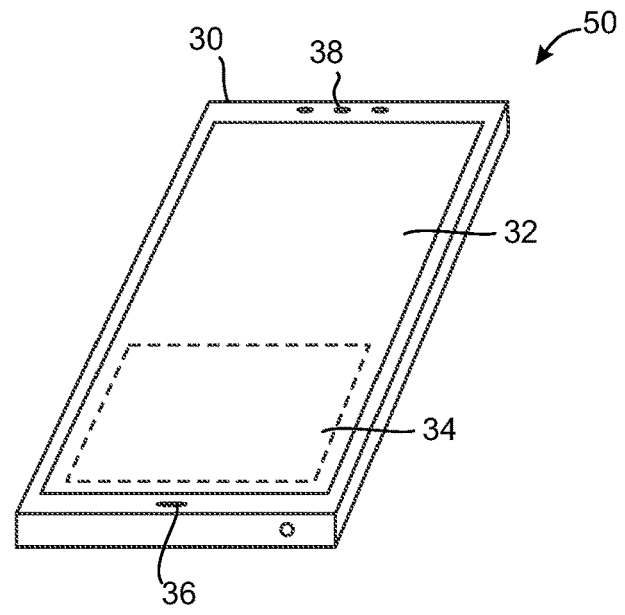
FIG. 2 shows schematically a user equipment suitable for employing embodiments of the invention.

The following describes in further detail suitable apparatus and possible mechanisms for carrying out the embodiments. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Many hybrid video encoders, such as H.264/AVC encoders, High Efficiency Video Coding (H.265/HEVC a.k.a. HEVC) and Versatile Video Coding (H.266/VVC a.k.a. VVC) encoders, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Figure 3A:
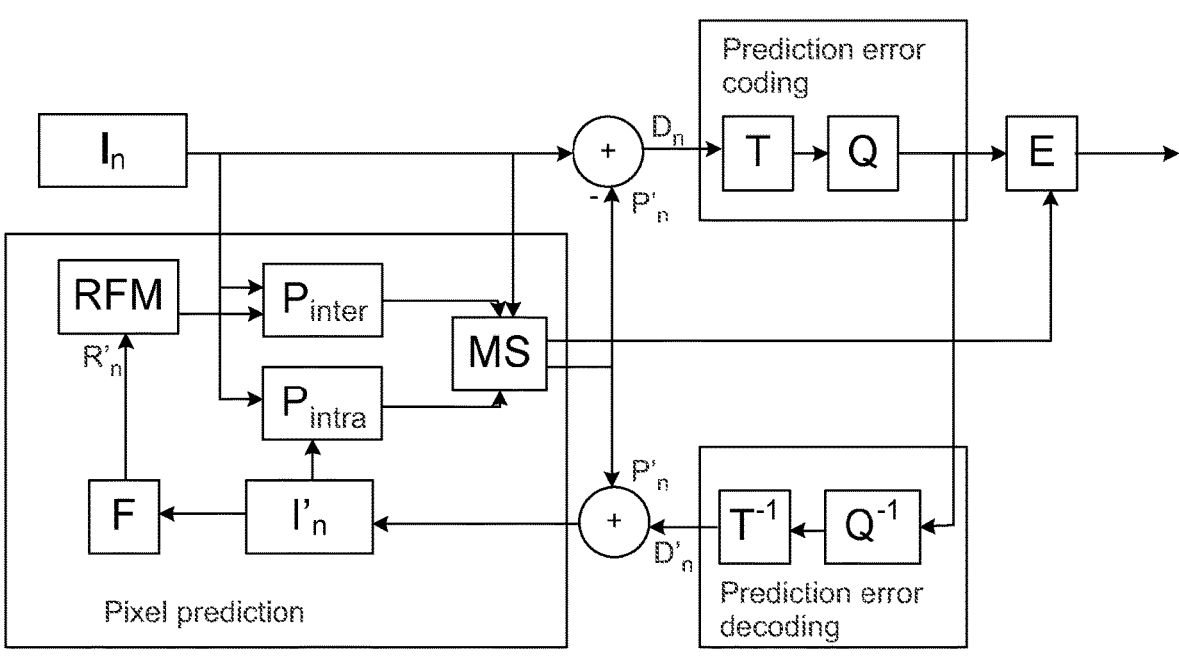
FIGS. 3a and 3b show schematically an encoder and a decoder suitable for implementing embodiments of the invention.
Figure 3B:
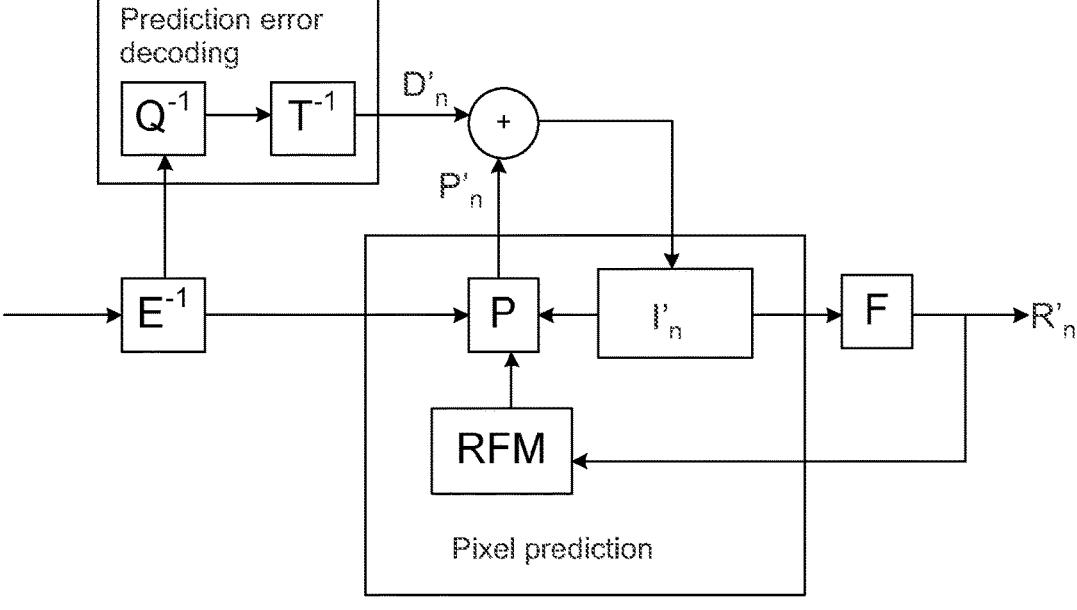

FIGS. 3a and 3b show an encoder and a decoder suitable for employing embodiments of the invention. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I''); a predicted representation of an image block (P'''); a prediction error signal (D''); a reconstructed prediction error signal (D'''); a preliminary reconstructed image (I'''); a final reconstructed image (R'''); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 3b. FIG. 3b illustrates a predicted representation of an image block (P'''); a reconstructed prediction error signal (D'''); a preliminary reconstructed image (I'''); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

The filtering may for example include one more of the following: deblocking, sample adaptive offset (SAO), and/or adaptive loop filtering (ALF). H.264/AVC includes a deblocking, whereas HEVC includes both deblocking and SAO.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/ HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

Versatile Video Coding (VVC) (MPEG-I Part 3), a.k.a. ITU-T H.266, is a video compression standard developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265.

Some key definitions, bitstream and coding structures, and concepts of HEVC and VVC are described in this section for illustrating the technical framework, where the embodiments, as described further below, may be implemented. Some of the key definitions, bitstream and coding structures, and concepts of H.266/VVC are the same as in H.264/AVC and H.265/HEVC. The embodiments are not limited to H.266/VVC, but rather the description is given for one possible basis on top of which the aspects of the invention and the related embodiments may be partly or fully realized.

An elementary unit for the input to an encoder and the output of a decoder, respectively, in most cases is a picture. A picture given as an input to an encoder may also be referred to as a source picture, and a picture decoded by a decoder may be referred to as a decoded picture or a reconstructed picture.

The source and decoded pictures are each comprises of one or more sample arrays, such as one of the following sets of sample arrays:

Luma (Y) only (monochrome),

Luma and two chroma (YCbCr or YCgCo),

Green, Blue and Red (GBR, also known as RGB),

Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) that compose a picture e.g. in 4:2:0, 4:2:2 or 4:4:4 chroma format or the array or a single sample of the array that compose a picture in monochrome format.

A picture may be defined to be either frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Some chroma formats (a.k.a color formats) may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

A syntax element may be defined as an element of data represented in the bitstream. A syntax structure may be defined as zero or more syntax elements present together in the bitstream in a specified order.

A NAL unit may be defined as a syntax structure containing an indication of the type of data to follow and bytes containing that data in the form of an RBSP interspersed as necessary with start code emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. The NAL unit header indicates the type of the NAL unit among other things.

NAL units can be categorized into Video Coding Layer (VCL) NAL units and non-VCL NAL units. VCL NAL units are typically coded slice NAL units.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. A parameter may be defined as a syntax element of a parameter set. A parameter set may be defined as a syntax structure that contains parameters and that can be referred to from or activated by another syntax structure for example using an identifier.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded video sequence (CVS) may be defined as such a sequence of coded pictures in decoding order that is independently decodable and is followed by another coded video sequence or the end of the bitstream. A coded video sequence may additionally or alternatively be specified to end, when a specific NAL unit, which may be referred to as an end of sequence (EOS) NAL unit, appears in the bitstream.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUS).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. Partitioning may be defined as a division of a set into subsets such that each element of the set is in exactly one of the subsets.

In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In the following, partitioning a picture into subpictures, slices, and tiles according to H.266/VVC is described more in detail.

A picture is divided into one or more tile rows and one or more tile columns. A tile is a sequence of coding tree units (CTU) that covers a rectangular region of a picture. The CTUs in a tile are scanned in raster scan order within that tile.

A slice consists of an integer number of complete tiles or an integer number of consecutive complete CTU rows within a tile of a picture. Consequently, each vertical slice boundary is always also a vertical tile boundary. It is possible that a horizontal boundary of a slice is not a tile boundary but consists of horizontal CTU boundaries within a tile; this occurs when a tile is split into multiple rectangular slices, each of which consists of an integer number of consecutive complete CTU rows within the tile.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture may be defined as a rectangular region of one or more slices within a picture, wherein the one or more slices are complete. Thus, a subpicture consists of one or more slices that collectively cover a rectangular region of a picture. Consequently, each subpicture boundary is also always a slice boundary, and each vertical subpicture boundary is always also a vertical tile boundary. The slices of a subpicture may be required to be rectangular slices.

One or both of the following conditions shall be fulfilled for each subpicture and tile:

All CTUs in a subpicture belong to the same tile.

All CTUs in a tile belong to the same subpicture.

The samples are processed in units of coding tree blocks (CTB). The array size for each luma CTB in both width and height is CtbSizeY in units of samples. The width and height of the array for each chroma CTB are CtbWidthC and CtbHeightC, respectively, in units of samples.

Each CTB is assigned a partition signalling to identify the block sizes for intra or inter prediction and for transform coding. The partitioning is a recursive quadtree partitioning. The root of the quadtree is associated with the CTB. The quadtree is split until a leaf is reached, which is referred to as the quadtree leaf. When the component width is not an integer number of the CTB size, the CTBs at the right component boundary are incomplete. When the component height is not an integer multiple of the CTB size, the CTBs at the bottom component boundary are incomplete.

The coding block is the root node of two trees, the prediction tree and the transform tree. The prediction tree specifies the position and size of prediction blocks. The transform tree specifies the position and size of transform blocks. The splitting information for luma and chroma is identical for the prediction tree and may or may not be identical for the transform tree.

The blocks and associated syntax structures are grouped into "unit" structures as follows:

One transform block (monochrome picture) or three transform blocks (luma and chroma components of a picture in 4:2:0, 4:2:2 or 4:4:4 colour format) and the associated transform syntax structures units are associated with a transform unit.

One coding block (monochrome picture) or three coding blocks (luma and chroma), the associated coding syntax structures and the associated transform units are associated with a coding unit.

One CTB (monochrome picture) or three CTBs (luma and chroma), the associated coding tree syntax structures and the associated coding units are associated with a CTU.

In VCC, the following divisions of processing elements form spatial or component-wise partitioning:

The division of each picture into components

The division of each component into CTBs

The division of each picture into subpictures

The division of each picture into tile columns

The division of each picture into tile rows

The division of each tile column into tiles

The division of each tile row into tiles

The division of each tile into CTUs

The division of each picture into slices

The division of each subpicture into slices

The division of each slice into CTUs

The division of each CTU into CTBs

The division of each CTB into coding blocks, except that the CTBs are incomplete at the right component boundary when the component width is not an integer multiple of the CTB size and the CTBs are incomplete at the bottom component boundary when the component height is not an integer multiple of the CTB size The division of each CTU into coding units, except that the CTUs are incomplete at the right picture boundary when the picture width in luma samples is not an integer multiple of the luma CTB size and the CTUs are incomplete at the bottom picture boundary when the picture height in luma samples is not an integer multiple of the luma CTB size The division of each coding unit into transform units The division of each coding unit into coding blocks The division of each coding block into transform blocks The division of each transform unit into transform blocks For each of the above-listed divisions of an entity A into entities B being a partitioning, it is requirement of bitstream conformance that the union of the entities B resulted from the partitioning of the entity A shall cover exactly the entity A with no overlaps, no gaps, and no additions.

Figure 4:
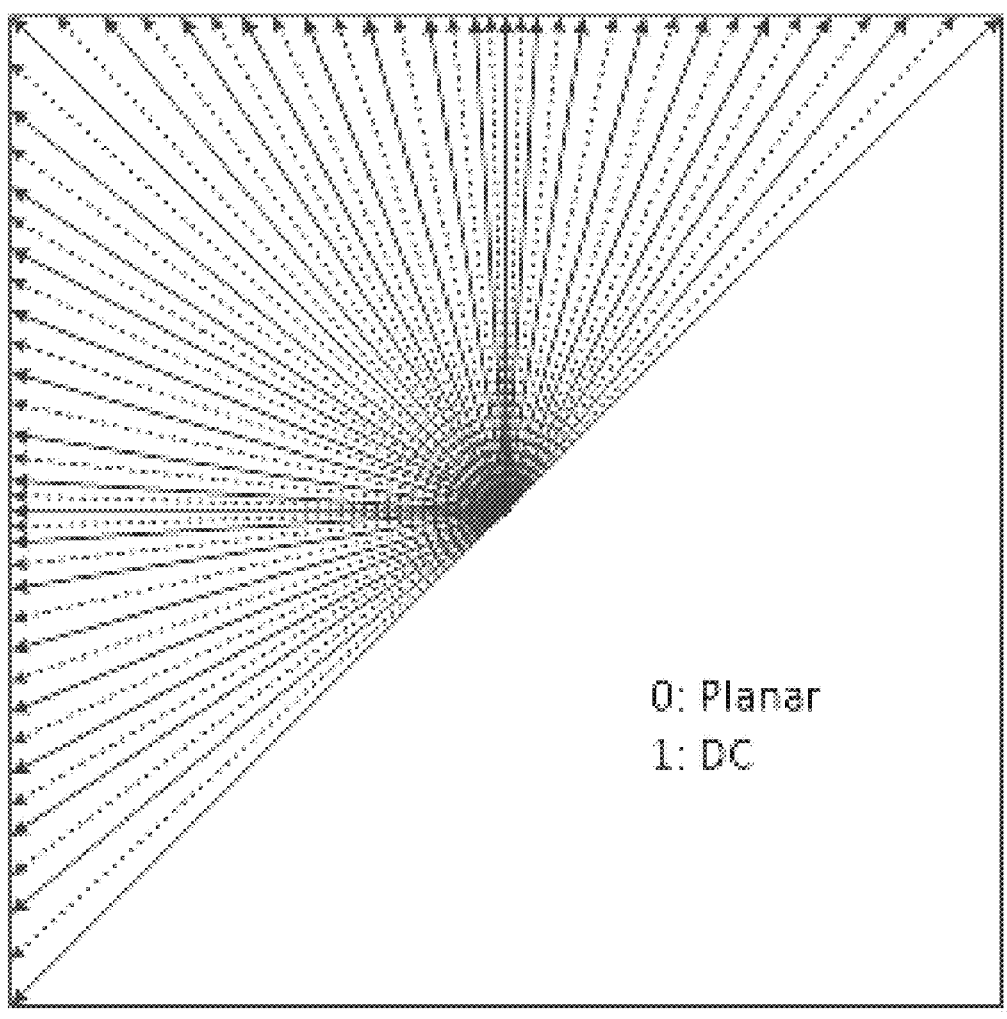
FIG. 4 shows the directional intra prediction modes of VVC.

In HEVC, multiple intra prediction modes are used to exploit spatial features and the number of Intra prediction modes depends on the block size of a Prediction Unit (PU). The size of the PU for intra coding can be 64×64, 32×32, 16×16, 8×8, or 4×4. The number of intra prediction modes is at most 35, including 33 directional (horizontal (HOR), vertical (VER) and other directions) prediction modes with their AC coefficients, one DC mode with its DC coefficients and one planar mode. To capture the arbitrary edge directions presented in natural video, the number of directional intra modes in VVC is extended from 33 to 65. The new directional modes not in HEVC are depicted as dotted arrows in FIG. 4 and the planar and DC modes remain the same. These denser directional intra prediction modes apply for all block sizes and for both luma and chroma intra predictions.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

In VVC, an intra mode coding method with 6 most probable modes (MPM) is used by considering two available neighbouring intra modes. The following three aspects are considered to construct the MPM list Default intra modes Neighbouring intra modes Derived intra modes A unified 6-MPM list is used for intra blocks irrespective of whether multiple-reference line (MRL) and intra sub-partitioning (ISP) coding tools are applied or not. The MPM list is constructed based on intra modes of the left and above neighbouring blocks.

The first bin of the MPM index codeword is CABAC context coded. In total three contexts are used, corresponding to whether the current intra block is MRL enabled, ISP enabled, or a normal intra block.

During the 6-MPM list generation process, pruning is used to remove duplicated modes so that only unique modes can be included into the MPM list. For entropy coding of the 61 non-MPM modes, a Truncated Binary Code (TBC) is used.

Figure 5A:
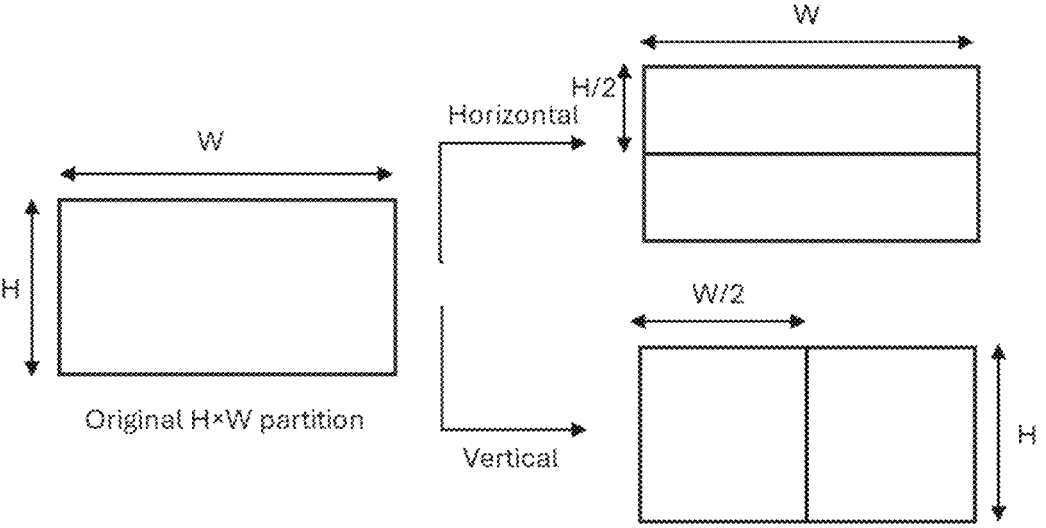
FIGS. 5a and 5b show examples of sub-partitions for various size coding units.
Figure 5B:
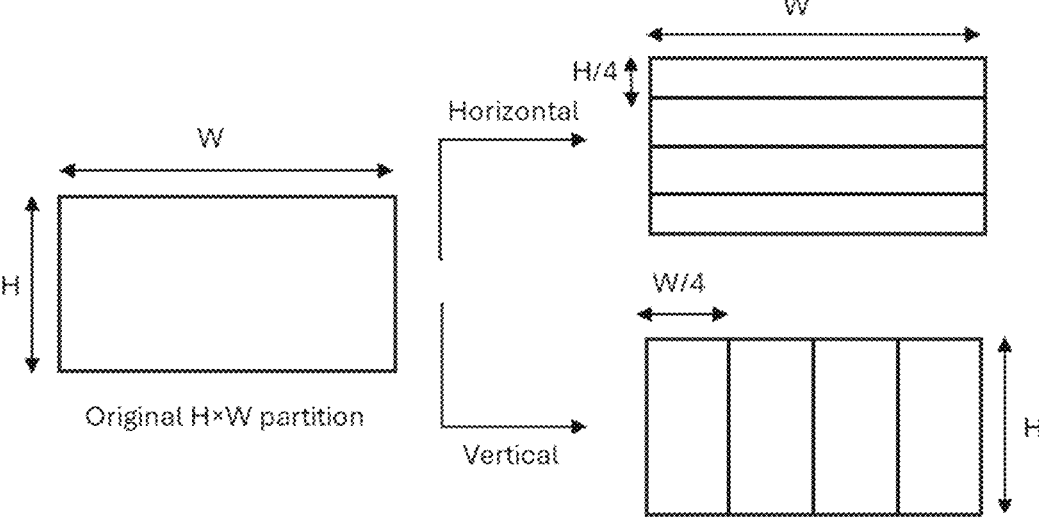

In VVC, intra sub-partitions (ISP) comprises luma intra-predicted blocks divided vertically or horizontally into 2 or 4 sub-partitions depending on the block size. The minimum block size for ISP is 4×8 (or 8×4). If block size is greater than 4×8 (or 8×4) then the corresponding block is divided by 4 sub-partitions. In the current design of ISP chroma blocks are not divided. FIGS. 5a and 5b show examples of the two possibilities, where FIG. 5a shows examples of sub-partitions for 4×8 and 8×4 coding units and FIG. 5b shows examples of sub-partitions for coding unit other than 4×8 and 8×4. All sub-partitions fulfil the condition of having at least 16 samples.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

Two ISP-related flags, namely, intra_subpartitions_mode_flag and intra_subpartitions_split_flag are designed to specify whether the current coding unit is partitioned and partition direction, respectively.

The intra_subpartitions_mode_flag equal to 1 specifies that the current intra coding unit is partitioned into NumIntraSubPartitions transform block subpartitions.

The intra_subpartitions_mode_flag equal to 0 specifies that the current intra coding unit is not partitioned. When intra_subpartitions_mode_flag is not present, it is inferred to be equal to 0.

The intra_subpartitions_split_flag specifies whether the intra subpartitions split type is horizontal or vertical. The variable IntraSubPartitionsSplitType specifies the type of split used for the current luma coding block as illustrated in the table below. IntraSubPartitionsSplitType is derived as follows:

If intra_subpartitions_mode_flag is equal to 0, IntraSubPartitionsSplitType is set equal to 0.

Otherwise, the IntraSubPartitionsSplitType is set equal to 1+intra_subpartitions_split_flag

| IntraSubPartitionsSplitType | Name of IntraSubPartitionsSplitType |
| --- | --- |
| 0 | ISP_NO_SPLIT |
| 1 | ISP_HOR_SPLIT |
| 2 | ISP_VER_SPLIT |

The variable NumIntraSubPartitions specifies the number of transform block subpartitions into which an intra luma coding block is divided. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:
cbWidth is equal to 4 and cbHeight is equal to 8,
cbWidth is equal to 8 and cbHeight is equal to 4.

Otherwise, NumIntraSubPartitions is set equal to 4.

Massively Parallel Processing (MPP) may be defined as a storage structure or a processing structure designed to handle the coordinated processing of program operations by multiple processors. When the processing is aimed for coding of media content, a term Massively Parallel Coding (MPC) may be used.

Parallel processing is a useful property for a video codec, which may enable the real-time operation and improve utilization of computational resources. Contemporary video codecs mainly support high-level parallelization using picture partitioning tools such as tile, slice, subpicture, and Wavefront (i.e., CTU-row partitioning), which are used as entry points for parallelization techniques. This kind of high-level parallelization has a limited scalability, and hence, a block/CTU-level massively parallel coding (MPC) of video content is desired. The massively parallel coding (MPC) is a necessity for real-time coding of emerging high-resolution content and large scale video streaming.

However, in a massively parallel video coding paradigm where parallel processing picture units, such as CTUs, are coded in parallel, reference samples from the adjacent reconstructed blocks are not available for reconstructing reference samples array in intra prediction, as the CTUs are coded independently. Thus, MPC may incur coding efficiency losses since the coding dependencies (both in terms of predictive coding and entropy coding) among the CTUs are prohibited.

In this case, it is desired to pack, code, and signal CTU boundary samples within a frame. The standard coding algorithms are designed for the normally sampled content. In order to efficiently code this kind of highly resampled content, the standard coding tools need to be tuned and optimized.

Now an enhanced method for improving the coding efficiency of the CTU boundary samples is introduced.

Figure 6:
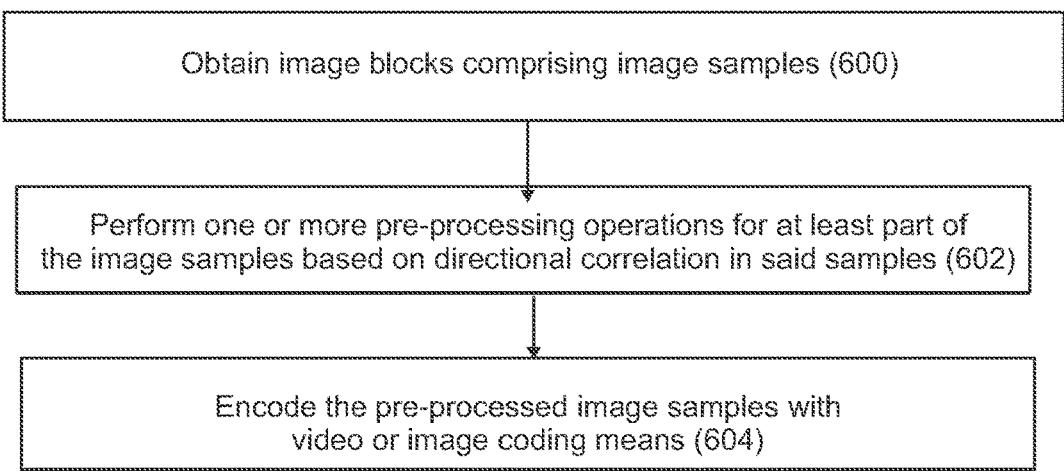
FIG. 6 shows a flow chart of an encoding method according to an embodiment of the invention.

A method according to an aspect is shown in FIG. 6, where an encoding method comprises obtaining (600) image blocks comprising image samples, performing (602) one or more pre-processing operations for at least part of the image samples based on directional correlation in said samples, and encoding (604) the pre-processed image samples with video or image coding means.

According to an embodiment, the image block comprise an original input image consisting of a plurality of parallel processing units and said pre-processing operation is configured to pick the image samples either above the parallel processing units to create horizontal reference line content, or on the left side of parallel processing units to create the vertical reference line content.

According to an embodiment, the image block comprises horizontal or vertical reference line image content, and the pre-processing operation is configured to downsample the content in reference line direction.

According to an embodiment, at least one of said pre-processing operations is configured to reduce the number of samples along a direction having a strong correlation of image content.

Figure 7:
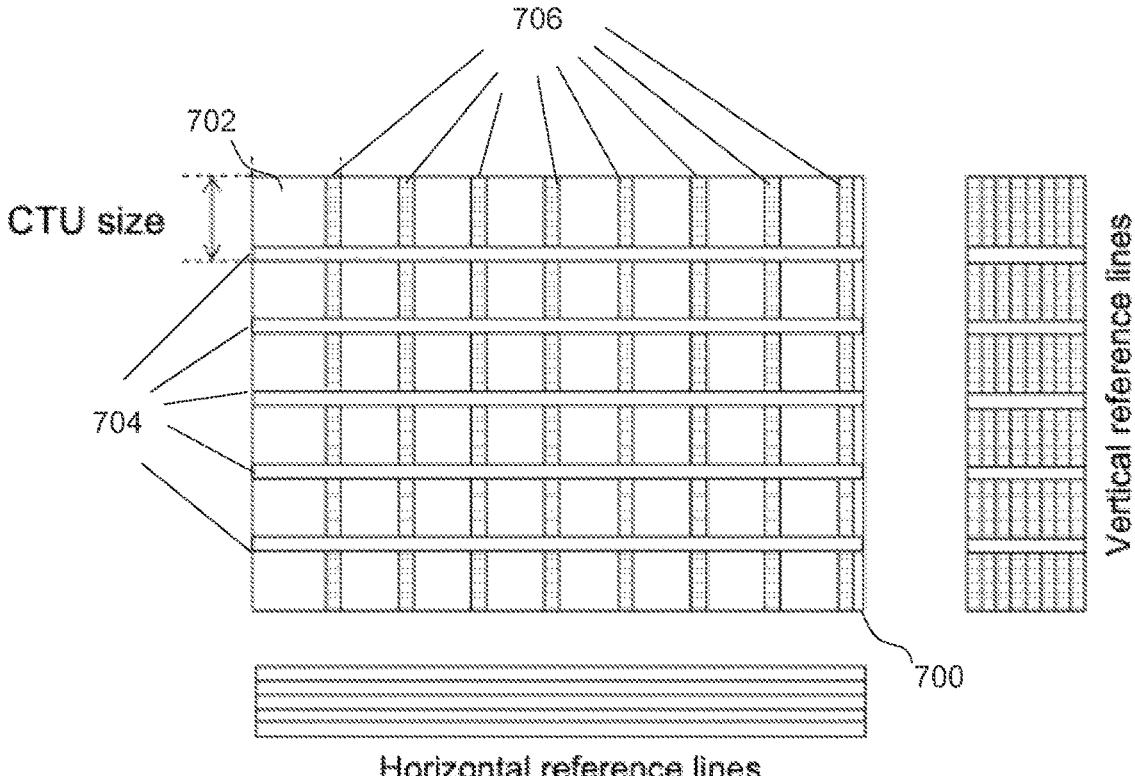
FIG. 7 illustrates the concept of reference lines.

FIG. 7 illustrates the concept of reference lines. In FIG. 7, a parallel processing unit, such as a CTU 702, is partitioned within a picture 700, where the lines 704 refer to the bottom-most line(s) samples within a parallel processing unit, such as a CTU, and the lines 706 refer to the right-most line(s) samples of CTUs. In a non-parallel coding scheme, these samples from the adjacent reconstructed blocks, in raster scan order, are available to form a prediction block for the current block. The lines 704 and 706 are called horizontal and vertical reference lines, respectively. In the figure, two exemplary packings are shown, where lines are stacked from top to bottom and from right to left, in horizontal and vertical reference lines respectively. In the horizontal reference lines, the source content is sampled vertically by a step size of CTU size, hence the content continuity is preserved in horizontal direction along the reference lines. In the vertical reference lines, the source content is sampled horizontally by a step size of CTU size, hence the content continuity is preserved in vertical direction along the reference lines. Herein, the direction in which the content continuity is preserved, is referred to as content/reference line direction.

One or more pre-processing operations may be performed on the reference lines content prior to coding.

According to an embodiment, at least one of said pre-processing operations comprises downsampling the content in the reference lines direction. Hence, the number of samples along the direction having a strong correlation of content is reduced.

According to an embodiment, at least one of said pre-processing operations comprises decimation (i.e., picking every M samples, M is size of parallel processing unit or CTU size) the content in the reference lines direction. Hence, the number of samples along the direction having a strong correlation of content is reduced.

According to an embodiment, at least one of said pre-processing operations comprises a packing operation. A packing operation may improve or preserve the directional correlation in the reference lines content.

According to an embodiment, said packing operation comprises packing horizontal and vertical reference lines content into a single picture using one or more partitioning operations. Thus, a single or multiple partitions using the picture partitioning operations (i.e., partitioning into subpictures, tiles, etc.) may be performed to pack horizontal and vertical reference lines content into a single picture. The vertical reference lines may be flipped to the horizontal direction, or vice versa.

Figures 8, 10:
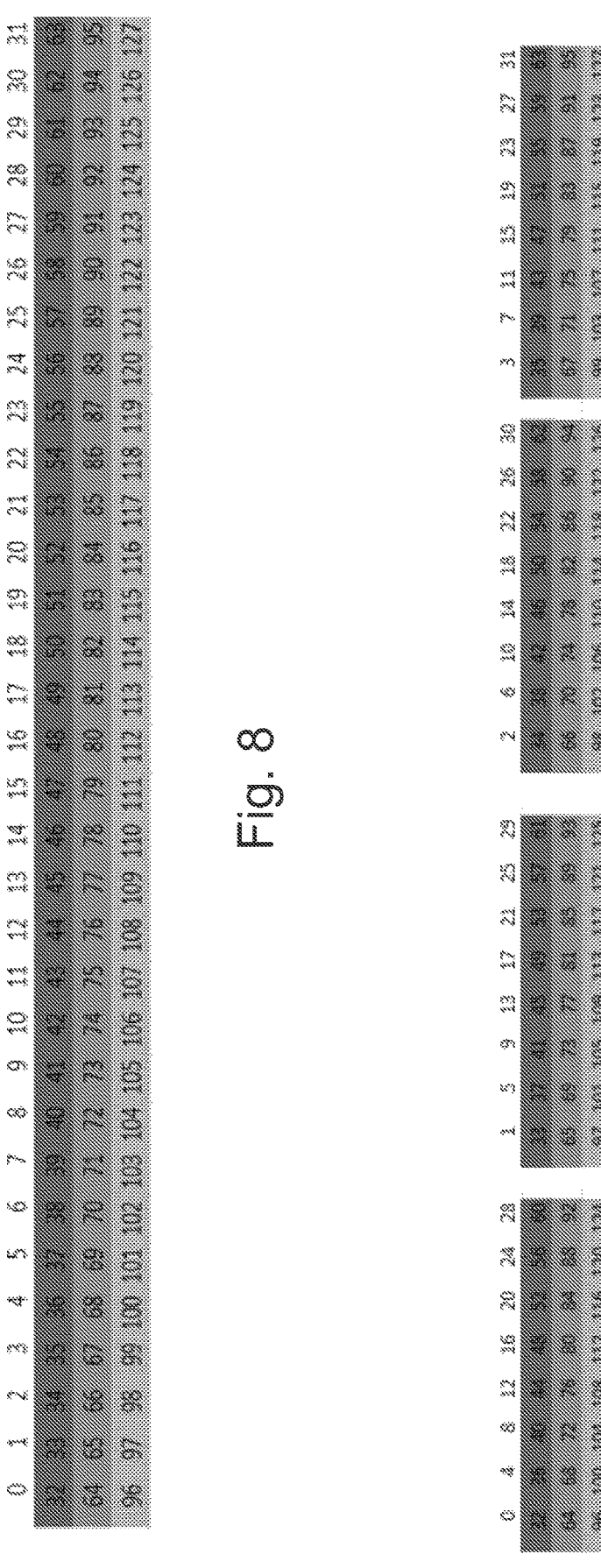
FIG. 8 shows a horizontal reference line packing according to an embodiment of the invention.
FIG. 10 shows an example of temporal packing of reference lines according to an embodiment of the invention.

The packing may be performed by stacking the lines, for example, in the same order as the reference lines sampling is performed from left to right for horizontal reference lines, and from top to bottom for the vertical reference lines. Such packing is shown in FIG. 8, and it is herein referred to as simple packing. The dimension of simple is (W)×(H/M) and (W/M)×(H) for horizontal reference line and vertical reference line contends, respectively, where W and H are width and height of the original input content, and M is the size of is size of parallel processing unit or CTU size.

Figures 9A, 9B:
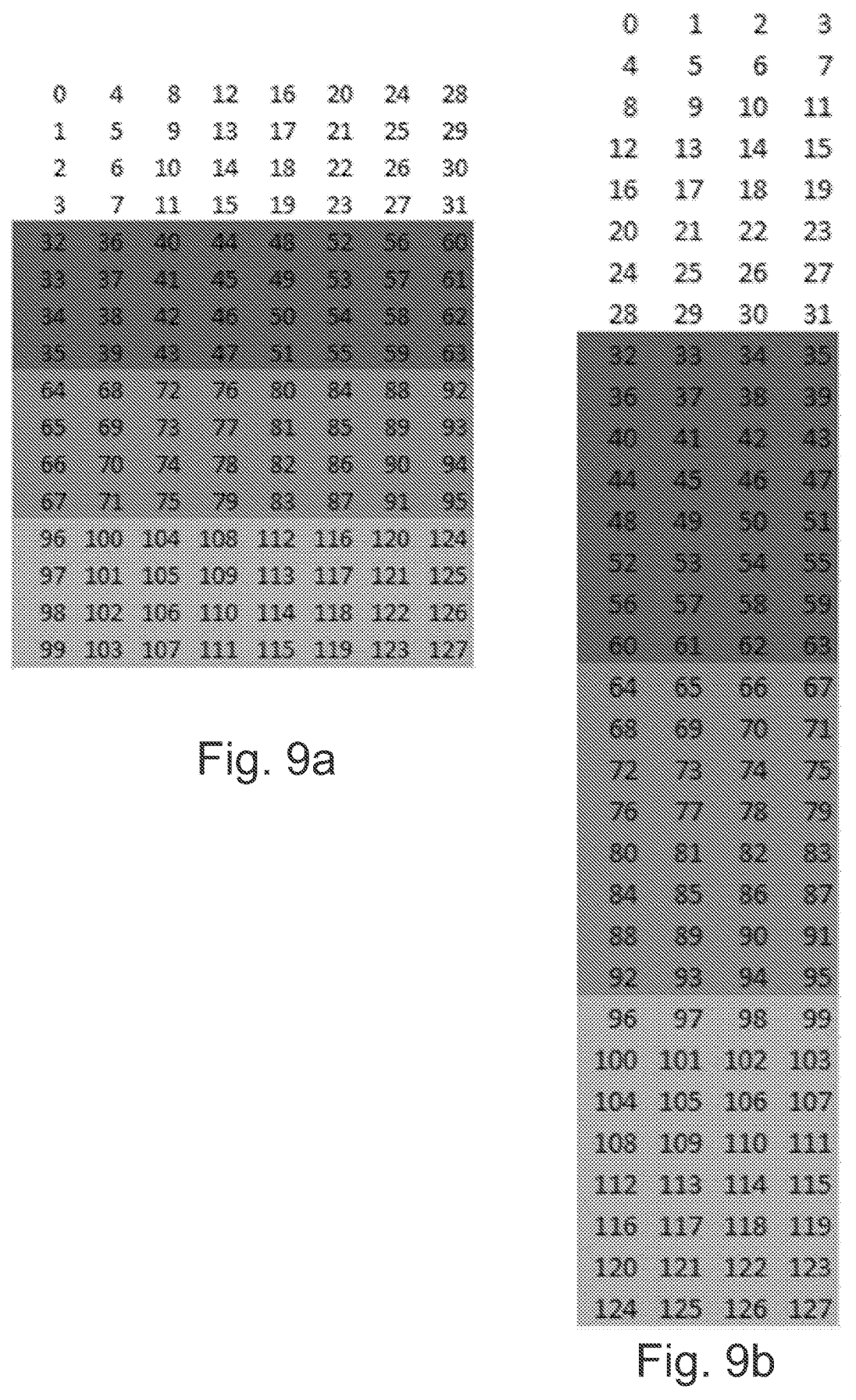

According to an embodiment, said packing operation comprises packing the horizontal or the vertical reference lines in units of a stride size of N samples in a first direction, and placing each of the N sample units in the first direction or a second direction. Thus, the packing may be carried out by scanning reference lines in units of a stride size of N samples in one direction (e.g. horizontal) and flipping the N sample units in other direction (e.g. vertical). FIG. 9*a* shows an example, where the stride size is 4 samples, wherein the horizontal samples are scanned in groups of 4 consecutive samples and each of the groups is placed in vertical arrangement. This effectively creates a 2-D array of each reference line, thus facilitating the use of existing 2-D coding tools. FIG. 9*b* shows another example, where the stride size is 4 samples, wherein the horizontal samples are scanned in groups of 4 consecutive samples and each of the groups is placed in horizontal arrangement. Thus, each reference lines may be reshaped into a 2-D block in units of a stride size of N, as shown in FIG. 9*b*. In FIGS. 9*a* and 9*b*, each colored block represents a reference line according to the simple packing shown in FIG. 8, where blocks may be stacked vertically or horizontally to form a picture.

According to an embodiment, reference line direction may refer to content direction after packing. For example in FIG. 8, the reference line direction is horizontal, but after packing as FIG. 9*a*, the direction of the content is vertical.

According to an embodiment, said packing operation comprises a loop of sampling the horizontal or the vertical reference lines with a stride size of every N samples, wherein the loop is repeated for each of offset values 1 to N defining the first sample to be sampled. Thus, each reference line may be sampled with a stride size of N and varying offset of 1 to N, the sampling result with each offset value forms a frame, and frames generated from different offset values are temporally concatenated, as shown in FIG. 10.

In an embodiment, each column (with dimension of (1)×(H)) of vertical reference line (with the dimension of (W/M)×(H)) may be packed using N=M to create a packed column (with dimension of (H/M)×(M)), and then be flipped diagonally or rotated by 90 degree to create a flipped packed column (with dimension of (M)×(H/M)). Then all the flipped packed columns of the vertical reference line content may be packed together to form a packed vertical reference line (with dimension of ((M*W/M)×(H/M)=(W)×(H/M). The packed vertical reference line has the same dimension and directionality of the horizontal reference line so it can be stacked on top of each other to be coded together. Similar packing may be applied to horizontal reference line to make it the same dimension as the vertical reference line.

In an embodiment, packed horizontal reference line and packed vertical reference line may have different directionality. So different content direction should be used when encoding each of them.

Figures 11, 12A, 12B:
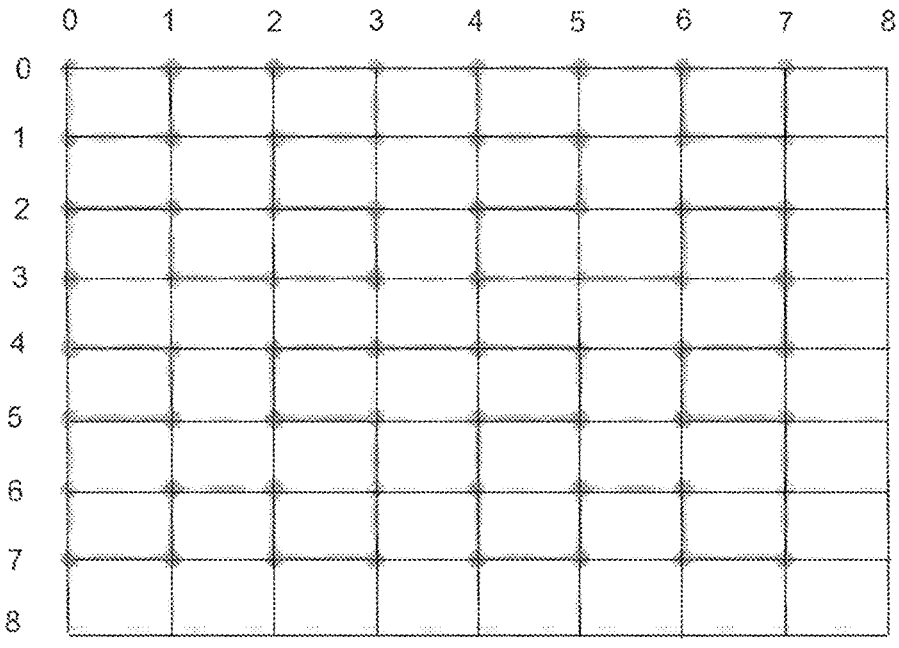
FIG. 11 shows an example of Hilbert curve space-packing pattern.
FIGS. 12a and 12b show examples of arranging transform coefficients according to some embodiments of the invention.

A space-filling pattern, such as Hilbert curve, may also be performed to map the reference lines content into another 2-D/3-D representation. FIG. 11 shows the filling of a 8×8 block using the Hilbert curve pattern.

According to an embodiment, the direction of reference lines is signaled by a picture-level indication. Thus, for example a picture-level flag may be defined to signal the direction of reference lines, by which the coding tools are optimized accordingly.

According to an embodiment, the direction of the reference lines is inferred from the location of the reference lines inside a frame. For example, the left side and top side of the picture may be considered to be vertical reference lines.

According to an embodiment, the direction of the reference lines is considered fixed either horizontally or vertically. For example, the direction of the reference lines may be always considered fixed e.g. horizontally, and the vertical reference lines may be processed/flipped to become horizontal reference lines, or vice versa.

According to an embodiment, said preprocessing operations comprise selecting a subset of coding tools from a set of coding tools and enabling said subset of coding tools for a coding block.

According to an embodiment, said preprocessing operations comprise selecting a subset of coding modes for a coding tool and enabling said subset of coding modes for a coding block.

According to an embodiment, selecting said subset of coding tolls or coding modes is carried out based on the content direction.

According to an embodiment, said preprocessing operations comprise modifying signaling of coding tools or modifying signaling of coding modes for a coding block.

According to an embodiment, said preprocessing operations comprise switching off one or more coding tools. Some coding tools may hurt the efficiency of reference lines coding, hence they can be switched off. Examples of these tools include luma mapping with chroma scaling (LMCS) and low-frequency non-separable transform (LFNST), which bring 0.8% and 0.3% YUV-BD-rate gain, respectively, when switched off.

Due to the strong correlation along the reference line direction, a 1-D transform may be applied instead of the common 2-D transform in order to exploit the directional correlation efficiently and thus improving coding efficiency. The 1-D transform is applied in the reference line direction. For example, for horizontal reference lines, only a horizontal 1-D transform is applied and the transform may be skipped in the vertical direction. After applying 1-D transform, the transform coefficients of a block are represented in a manner in which each row contains a DC coefficient followed by the AC coefficients, as depicted in FIG. 12*a*.

According to an embodiment, the 1-D transform may be applied to all blocks in the case of coding of highly resampled content. The direction of the 1D transform may be same as the reference line direction. In another embodiment, the 1D transform may be applied according to a TU- or CU-level flag.

According to an embodiment, vertical transform may be involved by additional shifting of output coefficients, so the same number of shifts in other direction may be applied to the samples prior to vertical transform.

After the 1D transform, a rearranging operation may be performed to organize the DC coefficients to the top-left area of the transform block, as illustrated in FIG. 12*b*. The resulting coefficient representation is more suitable for a conventional scanning order (i.e., zigzag or diagonal) of a coefficient coding engine. Another suitable scanning order is to first scan the DC coefficients, followed by scanning other AC coefficients toward the DCT coefficients related to higher frequencies. In an alternative embodiment, the scanning order of entropy coding may be modified. For example, in the case of horizontal 1-D transform, a vertical scanning order may be designed.

As shown in FIGS. 12*a* and 12*b*, there are multiple DC coefficients, and consequently there are multiple coefficients from each DCT frequency. However, the standard-compliant coefficients coding engines are mainly designed for normal DCT blocks, where there is only one coefficient from each frequency, for example one DC coefficient. To code the DCT blocks after 1-D transformation, all the DC coefficients may be considered as a coefficient (or coefficient group) which is related to one position in the 2-D DCT block. This means that, for example, entropy coding context for all of the DC coefficients related to said one position are calculated using the same rule for DC coefficients. As another example, the neighbouring samples may be calculated according to DCT coefficients grouping.

As described above in relation to signaling the intra sub-partitioning (ISP), the flags intra_subpartitions_mode_flag is used to specify whether the current coding unit is partitioned and intra_subpartitions_split_flag is used to specify the partition direction. The variable IntraSubPartitionsSplitType specifics the type of split used for the current luma coding block.

Figure 13:
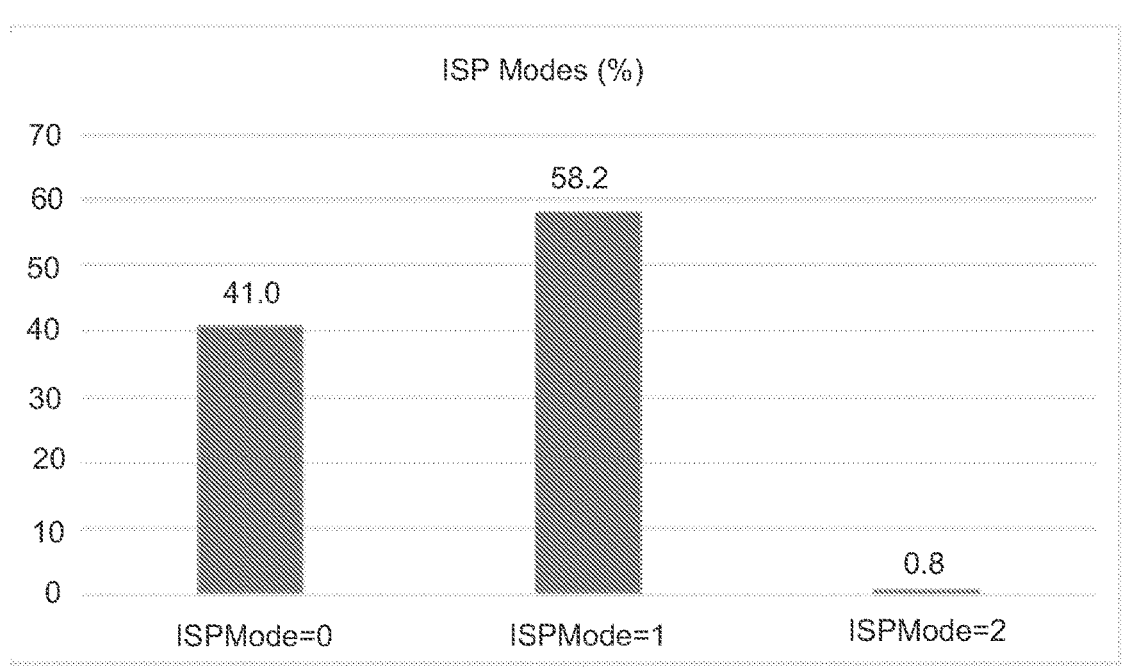
FIG. 13 shows an example of ISP split modes distribution in a horizontal reference line content.

According to an embodiment, the intra sub-partitioning (ISP) is limited to the reference line direction. Due to the specific directional correlation present in the content, the ISP splitting direction can be limited to the reference lines direction. Accordingly, the signaling of variable IntraSubPartitionsSplitType which specifics the type of split used for the current luma coding block may be removed. FIG. 13 shows the percentage of each ISP split mode in coding of a horizontal reference lines content, where the share of the vertical splitting (ISPMode=2) is 0.8% of the all three ISP split modes. Now for the horizontal reference lines, the ISP split modes may be limited to no split and horizontal split modes. For the vertical reference lines, the ISP split modes may be limited to no split and vertical split modes.

According to an embodiment, the ISP direction may be inferred at the decoder side based on the reference lines direction, for example indicated using a high-level flag in the bitstream. As an alternative embodiment, the ISP split flag may be coded in a simple manner, for example by setting to a desired value at the encoder side and coding that with a high-correlated context that its probability initialized to the maximum possible value.

According to an embodiment, a maximum number of allowed sub-partitions is configured to be ignored, when the intra sub-partitioning (ISP) is carried out in the reference line direction. Thus, the limitation on the number of sub-partitions, which e.g. in VVC is up to 4 sub-partitions, may be relaxed to allow more sub-partitions along the reference lines direction and enforce line-based coding.

In an embodiment, similar restriction on ISP mode can be extended to other channels (e.g. chroma channels). The ISP direction in chroma channels may be inferred in the decoder side from the corresponding luma block in the co-located position or from a block in the vicinity of the co-located block in luma channel. Alternatively, the ISP direction may be inferred from the high level syntax of the reference line direction in the decoder side.

According to an embodiment, intra prediction is configured to be carried out as one-dimensional (1-D) planar prediction. In order to exploit the strong directional correlation in the reference lines content efficiently, and facilitate the 1-D transform operation, a 1-D Planar prediction may be applied instead of the standard 2-D Planar prediction. In the 1-D Planar, only a prediction along the reference lines direction may be applied, and the prediction in the other direction may be ignored.

Figure 14:
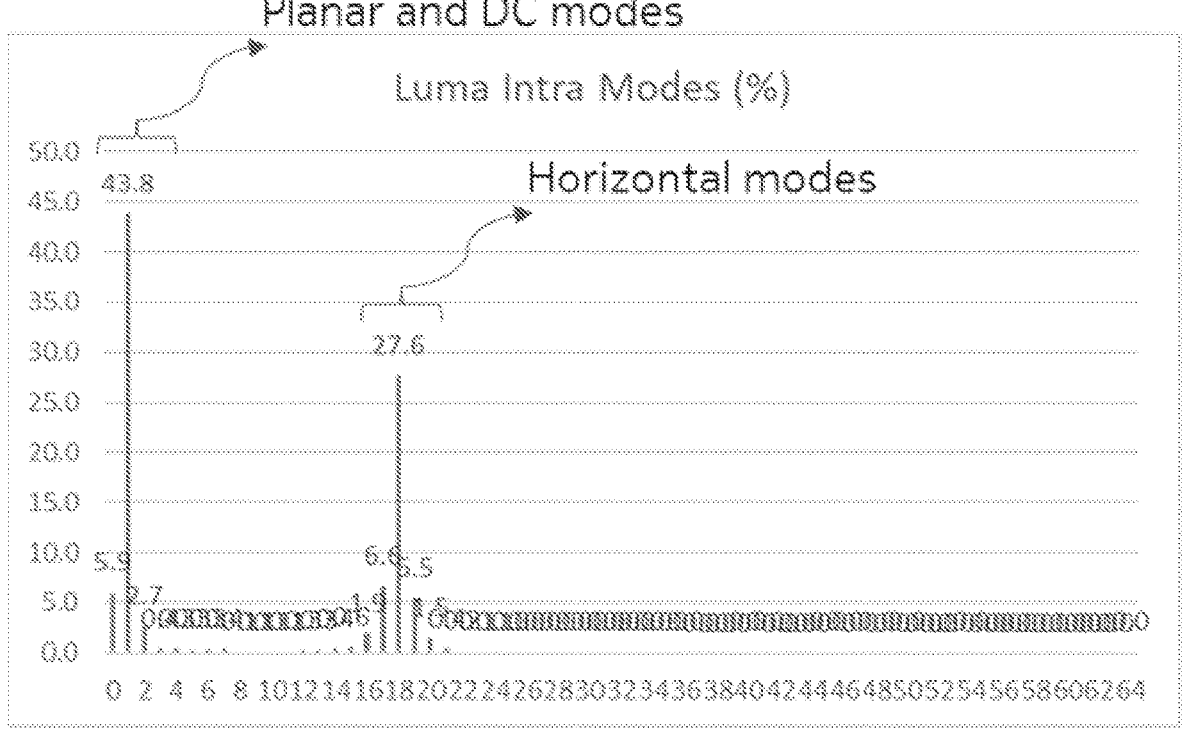
FIG. 14 shows an example of intra mode distribution in coding horizontal reference line content.

According to an embodiment, a filling order of the most probable mode (MPM) list is based on intra mode distribution in coding of reference lines content. Thus, the intra mode distribution in coding of reference lines content may be utilized to define the filling order of the most probable mode (MPM) list. FIG. 14 shows an example of the intra mode distribution of coding, e.g. horizontal reference lines content, where the DC, horizontal, and Planar modes are shown as the most probable intra modes. As an example, if the Planar mode has higher priority in the current filling order of MPM list, its priority may be changed with that of DC or horizontal modes.

In an embodiment, in the horizontal intra mode, the current averaging of the top line may be eliminated always or only for the other direction than the reference lines direction.

According to an embodiment, the MPM list generation is performed according to the direction of the reference line content. For example, if the reference line direction is horizontal, the MPM list in luma and/or chroma channels may consist of horizontal mode and if the reference line is vertical, the MPM lists may consist of the vertical mode. Additionally, in order to have more flexibility in reference line's direction-dependent predictions schemes, the MPM lists may include the horizontal and vertical predictions directions with some offsets as HOR/VER±Δ, in which the offset Δ may be a fixed number or is decided based on rate-distortion optimizations.

According to an embodiment, the MPM list of the chroma channels is altered according to the prediction mode of co-located luma block. For example, if the co-located luma block is coded in horizontal mode, the MPM list of chroma channels may include horizontal/vertical mode and horizontal/vertical mode with offset Δ.

According to an embodiment, the cross-component linear model (CCLM) mode is altered according to the reference line direction. For example, if the reference line is horizontal then the CCLM mode may be limited to left side mode which results in decrease in signaling of CCLM direction. The CCLM's direction may be also inferred from the co-located luma block's mode. For example if the co-located luma block is coded in horizontal mode (or even HOR±Δ), then the CCLM's direction may be limited to left side only.

According to an embodiment, the predictive direct power control (PDPC) filtering direction is adjusted according to the reference line direction. For example, if the reference line direction is horizontal, then the PDPC filtering process may use only the reference samples in the left side of the prediction block. Alternatively, the PDPC filtering may use both top and left reference samples but with higher weights assigned to the corresponding reference samples as the direction of the reference line.

According to an embodiment, the block partitioning of the codec is altered according to the direction of the reference line content. For example, in case of horizontal reference line content, the codec may use only horizontal splitting modes. In another example, the vertical-only splitting modes may be disallowed when the reference line content has horizontal direction. Such limitations can reduce the signalling overhead of the partitioning bits as well as speeds up the encoding process by disabling unnecessary partition modes. In an alternative approach, the partitioning mechanism may start from the direction of the reference line content instead of the conventional qual-tree partitioning.

The methods and the related embodiments can be implemented in different ways. For example, the order of operations described above can be changed or the operations can be interleaved in different ways. Also, different additional operations can be applied in different stages of the processing. For example, there may be additional filtering, scaling, mapping or other processing applied to the final or intermediate result of described operations. The final or intermediate result of the operations described above may also be further combined with results of other operations.

The encoding aspects may be implemented in an apparatus comprising means for obtaining image blocks comprising image samples; means for performing one or more pre-processing operations for at least part of the image samples based on directional correlation in said samples; and means for encoding the pre-processed image samples with video or image coding means.

The above embodiments may likewise be implemented in an apparatus comprising at least one processor and at least one memory, said at least one memory stored with computer program code thereon, the at least one memory and the computer program code configured to, with the at least one processor, cause the apparatus at least to perform: obtain image blocks comprising image samples; perform one or more pre-processing operations for at least part of the image samples based on directional correlation in said samples, and encode the pre-processed image samples with video or image coding means.

Figure 15:
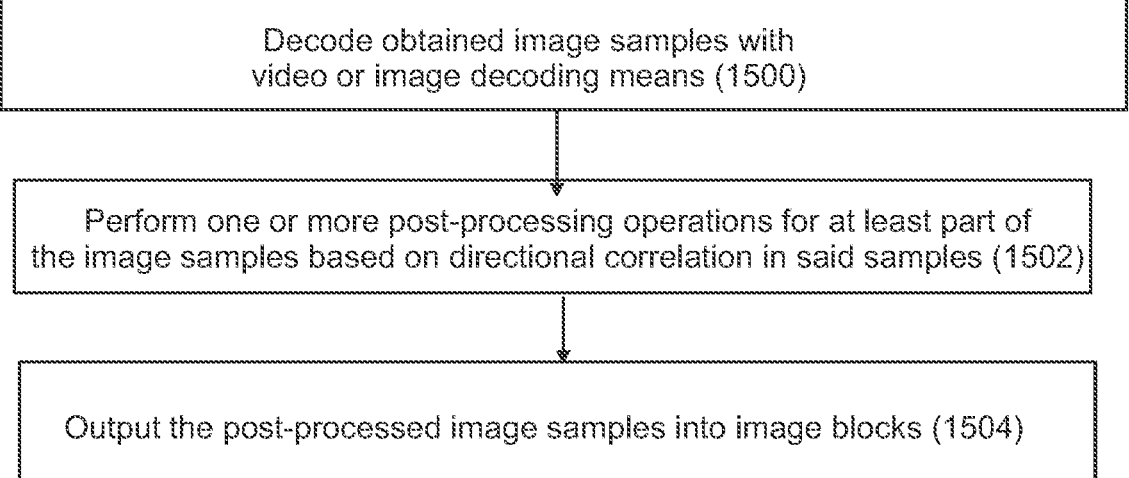
FIG. 15 shows a flow chart of a decoding method according to an embodiment of the invention.

A method according to another aspect is shown in FIG. 15, where a decoding method comprises decoding (1500) obtained image samples with video or image decoding means; performing (1502) one or more post-processing operations for at least part of the image samples based on directional correlation in said samples; and outputting (1504) the post-processed image samples into image blocks.

The decoding aspects may be implemented in an apparatus comprising: means for decoding obtained image samples with video or image decoding means; means for performing one or more post-processing operations for at least part of the image samples based on directional correlation in said samples; and means for outputting the post-processed image samples into image blocks.

The decoding aspects may likewise be implemented in an apparatus comprising at least one processor and at least one memory, said at least one memory stored with computer program code thereon, the at least one memory and the computer program code configured to, with the at least one processor, cause the apparatus at least to perform: decode obtained image samples with video or image decoding means; perform one or more post-processing operations for at least part of the image samples based on directional correlation in said samples; and output the post-processed image samples into image blocks.

Herein, the decoder should be interpreted to cover any operational unit capable to carry out the decoding operations, such as a player, a receiver, a gateway, a demultiplexer and/or a decoder.

Such apparatuses may comprise e.g. the functional units disclosed in any of the FIGS. 1, 2, 3a, and 3b for implementing the embodiments.

Figure 16:
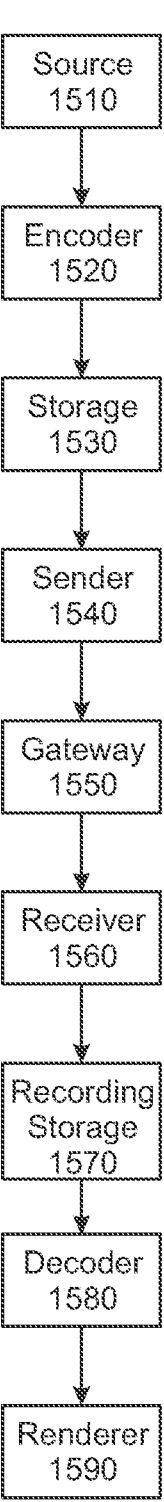
FIG. 16 shows a schematic diagram of an example multimedia communication system within which various embodiments may be implemented.

FIG. 16 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additionally comprise computation memory, such as random access memory.

The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:

at least one processor; and at least one memory including computer program code; the at least one memory and the computer program code configured to, with the at least one processor, cause the apparatus at least to:

obtain image blocks comprising image samples;

perform one or more pre-processing operations for at least part of the image samples based on directional correlation in said image samples, wherein at least one of the one or more preprocessing operations is configured to reduce a number of image samples along a direction having a strong correlation of an image content; and encode the pre-processed image samples.

2. The apparatus according to claim 1, wherein:

at least one of said pre-processing operations comprises downsampling the image content in direction of a reference line.

3. The apparatus according to claim 1, wherein: at least one of said pre-processing operations comprises a packing operation.

4. The apparatus according to claim 3, wherein the apparatus upon execution is further caused to:

pack horizontal and vertical reference lines content into a single picture by using one or more partitioning operations.

5. The apparatus according to claim 3, wherein the apparatus upon execution is further caused to:

pack horizontal or vertical reference lines in units of a stride size of N samples in a first direction; and place each of N sample units in the first direction or a second direction.

6. The apparatus according to claim 3, wherein the apparatus upon execution is further caused to:

perform a loop of sampling horizontal or vertical reference lines with a stride size of every N samples, wherein the loop is repeated for each of offset values 1 to N defining a first set of samples to be sampled.

7. The apparatus according to claim 1, wherein the apparatus upon execution is further caused to:

apply a one-dimensional (1-D) spatial-to frequency domain transform on the image samples in direction of the reference line.

8. The apparatus according to claim 2, wherein the apparatus upon execution is further caused to:

signal direction of the reference line by a picture-level indication.

9. The apparatus according to claim 2, wherein:

at least one of said pre-processing operations comprises switching off one or more coding tools.

10. The apparatus according to claim 2, wherein the apparatus upon execution is further caused to:

limit an intra sub-partitioning (ISP) to the direction of the reference line.

11. The apparatus according to claim 2, wherein the apparatus upon execution is further caused to:

ignore a maximum number of allowed sub-partitions, when an intra sub-partitioning (ISP) is carried out in the direction of the reference line.

12. The apparatus according to claim 1, wherein the apparatus upon execution is further caused to:

carry out intra prediction as one-dimensional (1-D) planar prediction.

13. The apparatus according to claim 1, wherein:

a filling order of a most probable mode (MPM) list is based on intra mode distribution in coding of reference lines content.

14. The apparatus according to claim 2, wherein the apparatus upon execution is further caused to:

alter a cross-component linear model (CCLM) mode according to the direction of the reference line.

15. A method comprising:

obtaining image blocks comprising image samples, performing one or more pre-processing operations for at least part of the image samples based on directional correlation in said image samples, wherein at least one of said pre-processing operations is configured to reduce a number of image samples along a direction having a strong correlation of an image content; and encoding the pre-processed image samples.

16. The method according to claim 15, wherein:

at least one of said pre-processing operations comprises downsampling the image content in direction of a reference line.

17. The method according to claim 15, wherein:

at least one of said pre-processing operations comprises a packing operation.

18. The method according to claim 17, comprising:

packing horizontal and vertical reference lines content into a single picture using one or more partitioning operations.

19. The method according to claim 17, comprising:

packing the horizontal or the vertical reference lines in units of a stride size of N samples in a first direction; and placing each of N sample units in the first direction or a second direction.

20. The method according to claim 17, further comprising:

performing a loop of sampling the horizontal or the vertical reference lines with a stride size of every N samples, wherein the loop is repeated for each of offset values 1 to N defining a first set of samples to be sampled.

* * * * *